Oct. 23, 1951     T. K. ALMROTH ET AL     2,572,580

METHOD FOR PREFABRICATING GLASS BLOCK PANELS

Filed Feb. 13, 1948     2 SHEETS—SHEET 1

INVENTORS
THOMAS KIRK ALMROTH
THOMAS KIRK ALMROTH, JR.
BY
—ATTORNEY—

Oct. 23, 1951 T. K. ALMROTH ET AL 2,572,580
METHOD FOR PREFABRICATING GLASS BLOCK PANELS
Filed Feb. 13, 1948 2 SHEETS—SHEET 2
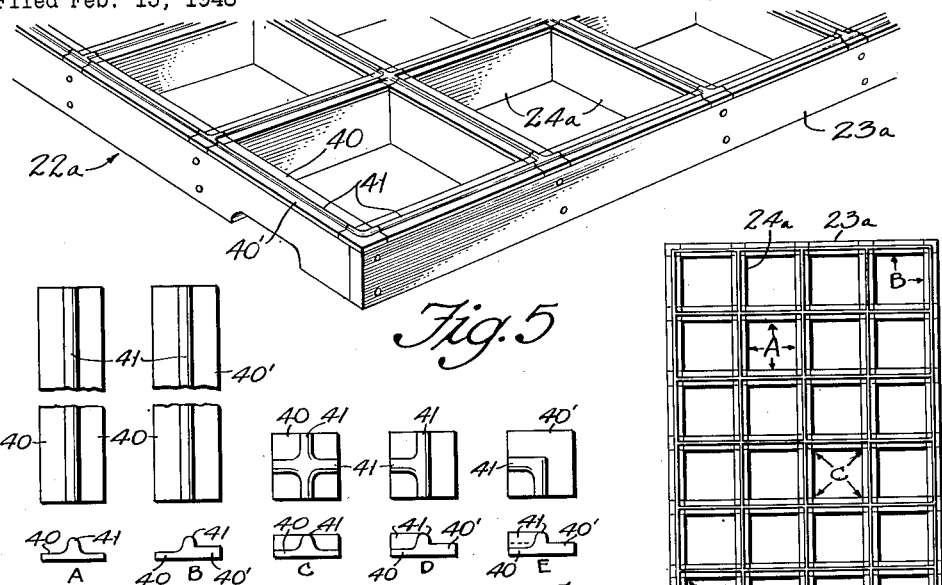
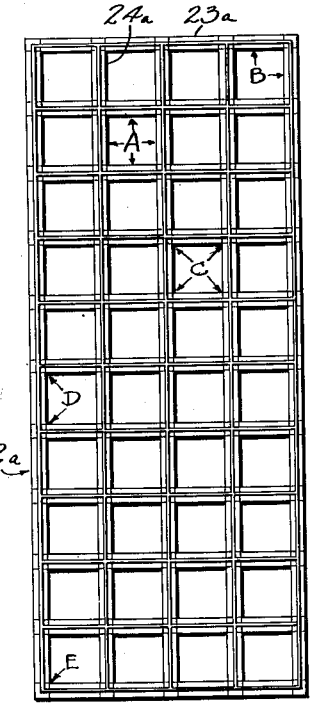
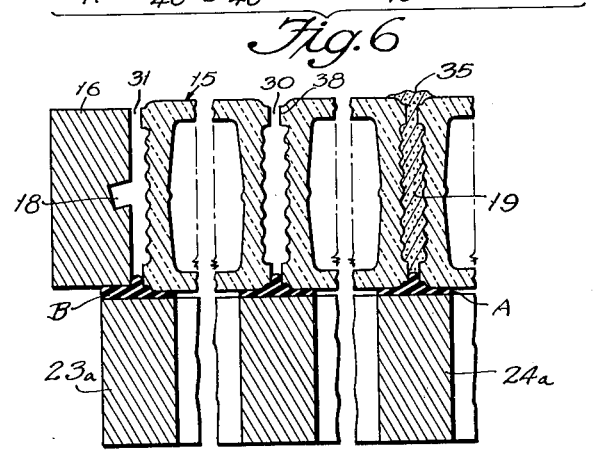
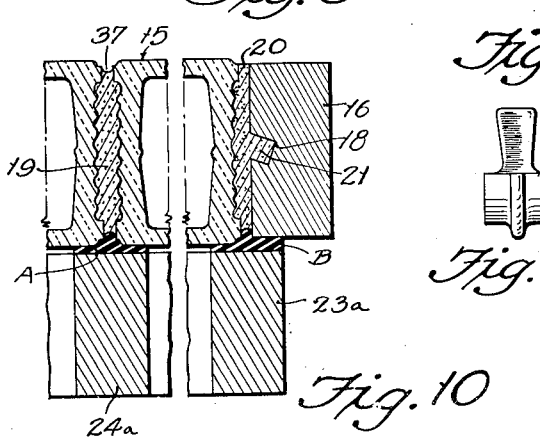
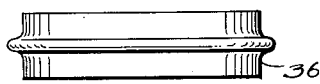
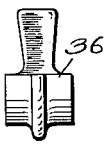
INVENTORS
THOMAS KIRK ALMROTH
THOMAS KIRK ALMROTH, JR.
BY
Lynn Latta
—ATTORNEY—

Patented Oct. 23, 1951

2,572,580

UNITED STATES PATENT OFFICE 2,572,580

METHOD FOR PREFABRICATING GLASS BLOCK PANELS

Thomas Kirk Almroth and Thomas Kirk Almroth, Jr., Van Nuys, Calif.

Application February 13, 1948, Serial No. 8,074

9 Claims. (Cl. 18—59)

This invention relates to the fabrication of glass block panels of the prefabricated type embodying a plurality of glass blocks mounted within a frame of nailable members such as 2" x 4" timbers. The general object of the present invention is to provide improved methods for prefabricating such panels.

The prime object of the invention is to provide a method whereby glass block panels may be fabricated with less expense than the expense involved in laying a glass block panel at a building site. More particularly, the invention contemplates the prefabrication of a glass block panel at a factory and the transportation of the complete panel as an integral building unit to a building site, where it may be readily inserted by a carpenter into a framed opening in a building, eliminating the necessity for the mason to make a return trip to a building site long after he has performed the main masonry work on the building. A substantial element in the prevailing high cost of glass block panels in small buildings is the matter of transportation of the mason to and from the job to do a piece of work which requires a relatively small amount of time in itself. This is true particularly in view of the fact that it is not customary to embody large areas of glass block paneling in small buildings and homes, although a considerable demand for relatively small panels in homes and small commercial buildings has developed. Another element is the high rate charged by the mason because of the relative unimportance of the job to him. Because of the high cost involved, there is a definite need for some means of providing such panels at lower expense, and it is our object to attain this by prefabricating the panel away from the building site, using production methods in doing so.

An essential characteristic of the invention is the utilization, as part of the fabricating apparatus, of a retaining frame which becomes a permanent part of the panel and which may be secured in a building simply by nailing it in place. The fabricating apparatus includes, in addition to such frame, a jig which has means for properly spacing the glass blocks in the positions they are to occupy in the finished panel. The jig, in addition to this function of positioning the blocks, cooperates with the retaining frame to define a mould in which the panel is cast. Thus the blocks may be first assembled on the jig, and the frame may then be applied to the jig to form the mould.

Another object is to provide a method which leaves the panel in finished condition immediately upon removal from the jig.

Accordingly, an object of the invention is to provide a method whereby a glass block panel embodying a peripheral retaining frame of nailable material may be accurately prefabricated quickly and inexpensively by simply associating the frame with a jig that is adapted to position the blocks within the frame and to cooperate therewith and with the blocks to seal the spaces between the respective blocks and between the blocks and the frame so that mortar may be applied to the panel simply by pouring or forcing it into such sealed spaces.

Other objects will become apparent in the ensuing specifications and appended drawings in which:

Fig. 5 is a perspective view of a portion of a jig embodying a modified form of the invention;

Fig. 6 is a view illustrating a series of the sealing element which may be assembled to provide the edge portion of the jig shown in Fig. 5;

Fig. 7 is a plan view of the jig of Fig. 5;

Fig. 8 is a detail sectional view of separated portions of a mould embodying the jig of Fig. 5, illustrating a number of glass blocks assembled therein and illustrating the application of the bonding agent between the blocks;

Figs. 9, 9a and 9b are a series of views of a tuck-pointing tool for use in finishing a panel made in the apparatus shown in Figs. 1 to 4 or that shown in Figs. 5 to 8;

Fig. 10 is a transverse sectional view of a portion of a panel after it has been tuck-pointed.

Figure 1:
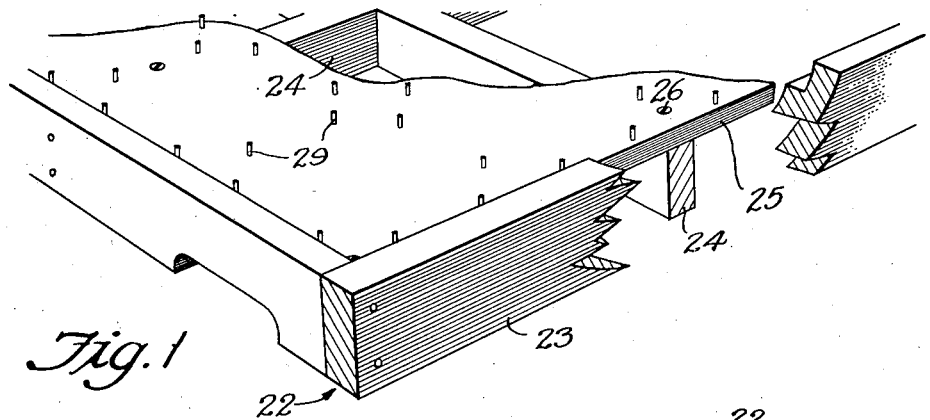
Fig. 1 is a perspective view of a portion of a jig embodied in our improved panel fabricating apparatus.
Figure 3:
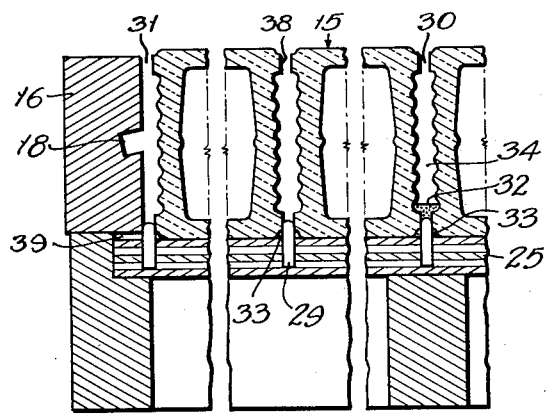
Fig. 3 is a transverse sectional view through separated portions of a mould embodying the invention.

In Fig. 10 we have shown a fragmentary sectional view of a glass block panel constructed by the use of the method and apparatus of our invention. Such panel comprises a series of glass blocks 15 mounted in a wooden frame 16. The frame 16 is constructed from four wooden bars (e. g. 2 x 4's) nailed together at their ends as indicated at 17. Each of the bar members of the frame 16 has in its inner side a longitudinally extending groove 18. The blocks 15 are uniformly spaced from each other and from the inner periphery of the frame 16, the spaces between the blocks being filled with layers of mortar 19 (Fig. 4) and the spaces between the outer sides of the blocks and the inner periphery of the frame 16 being filled with a peripheral layer 20 of mortar. Integral tongues 21 project from the outer sides of the peripheral layer 20 into the grooves 18 to form an interlocking connection with the frame 16.

Figure 2:
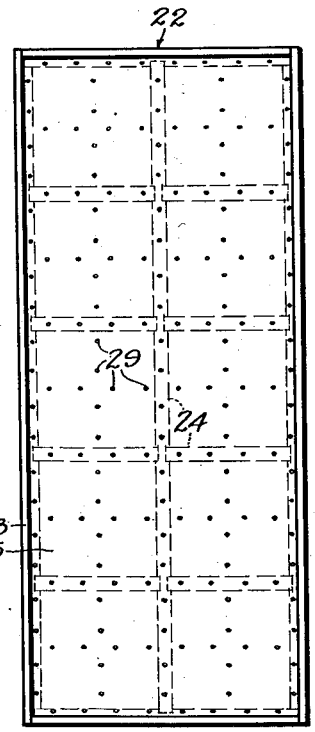
Fig. 2 is a plan view of such a jig.

In constructing a panel in accordance with the method illustrated in Figs. 1 to 4 inclusive, we employ a jig such as that indicated generally at 22 in Figs. 1 and 2. Such a jig comprises a peripheral frame 23, which may consist in four wooden frame members nailed together at the corners of the frame; a supporting and reenforcing grid 24 comprising crossed members extending longitudinally and transversely between the ends and sides respectively of the frame 23, and a plate 25 supported upon and secured (as at 26) to the upper edges of the grid 24. The plate 25 is supported peripherally upon shoulders 27 in the peripheral frame 22, formed by rabbeting the members of the frame as at 28.

The jig 22 is provided with crossed rows of positioning or pilot pins 29, spaced so as to define a series of squares corresponding to the peripheral dimensions of the glass blocks 15. To be more specific, the spacing of the pins 29 is such that the glass blocks will be snugly received between the several pins defining a particular square, and securely positioned in properly spaced relationship, the thickness of the pins determining the width of the spaces 30 (Fig. 3) between the blocks, into which mortar is inserted to form the mortar bonds 19. The outer rows of pins are positioned so as to be snugly received within the inner periphery of a frame 16, and thus determine the width of the peripheral space 31 in which the peripheral layer 20 of mortar is cast.

In the casting of a panel, the frame 16 cooperates with the jig 22 to constitute a form or mould. The glass blocks 15 are arranged in the jig, the frame 16 is placed around the group of blocks and rested upon the upper faces of the frame 23, and sand 32 is then poured into the spaces 30 and 31, filling those spaces to a height above the upper edges of the pins 29. The purpose of the sand is to hold back the mortar so that it will not enter the flaring outer extremities 33 of the spaces 30 and 31 adjacent the outer faces of the blocks. Preferably, the sand is inserted to a level slightly above the lower extremities of the wider inner portions 34 of the spaces 30 and 31, so as to provide for retention of tuck-pointing mortar that is inserted in the spaces left by the removal of the sand after the panel has been cast. The reasons for building the level of the sand above the upper ends of the pins 29 are to avoid leaving any impression of pins in the mortar, and to protect the jig against becoming incrusted with mortar. Since the pins extend into the spaces 30 and 31 beyond the line occupied by the surface of the outer edges of the mortar in the finished panel, such depressions would occur if the sand were not used.

Mortar is then poured into the spaces 30 and 31, to bond the blocks 15 to each other and to the frame 16 in an integral unit. The mortar is prepared in a fairly liquid state so that it will readily fill all crevices in the spaces 30 and 31. By employing a vibrator having a thin blade that will extend into the spaces 30 and 31, it is possible to employ a somewhat thicker slurry and to settle it into the crevices between the blocks by vibration.

Figure 4:
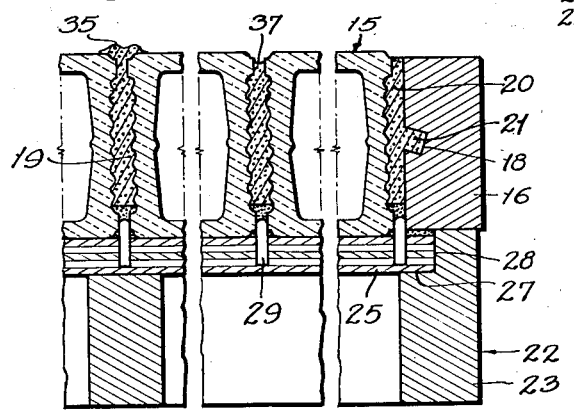
Fig. 4 is a transverse sectional view through portions of the opposite side thereof.

The mortar is poured to a height above the mortar finish line at the upper side of the block assembly, as indicated at 35 in Fig. 4. The excess mortar is then removed by a tuck-pointing tool such as the tool 36 shown in Fig. 9. This operation leaves the mortar joint with a finish edge such as that indicated at 37 in Fig. 4.

After the mortar has been fully poured and tuck-pointed on the upper face of the panel, the panel is allowed to rest, free of any vibration or disturbance, until the mortar has fully set. The panel is then lifted bodily from the jig 22, and is inverted on a flat, level supporting surface. The remaining sand in the now upper extremities of the spaces 30 and 31 is then cleaned out with a stiff brush, and mortar is poured into the spaces left by the removal of the sand, and is tuck-pointed in the same manner as on the other side of the panel. It will now be apparent that this tuck-pointing mortar will have enlarged flange portions occupying the extremities of the wider portion of the spaces 34, and will thereby be securely held against dislodgement from the panel.

The panel thus formed constitutes an integral building unit having a frame 16 of nailable material. The mortar within the enlarged portions 34 of the spaces interlocks with the peripheral flanges 38 of the blocks, in the conventional manner, to securely retain the blocks in place in the panel.

The side extremities of the frame 16 lie in planes flush with the outer corners of the flanges 38, with the rounded corners and the exposed faces of the blocks projecting beyond these planes so as to bring out to the fullest extent the beauty of design of the blocks. This is arranged for by having the supporting face of the plate 25 recessed below the edge faces of the frame 22, as indicated at 39 in Fig. 3.

It is contemplated that the frames 16 will be prefabricated in a mill and delivered in prefabricated form to the plant where the panels are cast. Prior to the casting process, the inner faces of the frame, including the groove 18, are coated with a sealing compound such as asphalt emulsion to seal the wood against penetration thereof by moisture from the mortar 19 prior to the time when the mortar becomes dry. This coating step may be performed at the casting plant, but it is preferably taken care of at the mill.

In the modified method employing the apparatus shown in Figs. 5 to 8 inclusive, we provide a jig 22a which eliminates the necessity for filling the lower extremities of the spaces 30 and 31 with sand. The jig 22a has means which may be employed in place of the pins 29 and sand 32, to locate the blocks and fill the lower regions of spaces 30, 31 for the initial mortar-pouring step, so as to leave channels which may later be filled with mortar and tuck pointed, or which may be utilized to provide finished mortar surfaces so as to eliminate the necessity for filling such channels with a second application of mortar, and subsequently tuck-pointing the same. This is accomplished by substituting for the positioning pins 29, a grid composed of a plurality of members A, B, C, D and E that are bonded to the upper faces of the frame and grid members 23a and 24a respectively. The upper faces of the grid members 24a, instead of being recessed below the upper surfaces of the members 23a as in the form shown in Figs. 1 to 4 inclusive, are flush with the upper surfaces of the form 22a and said upper surfaces are unrecessed. Consequently, the grid members A—E lie in a common flat plane.

The grid members A—E are of soft rubber or equivalent resilient material, and each includes a flange portion 40 for adhesive attachment to the upper face of a corresponding frame member 23a or 24a, and a beaded portion 41 which enters the lower extremity of a space 30 or 31 as the case may be so as to function as a positioning pilot. The outer faces of the glass blocks 15 rest upon the flanges 40 so as to form a seal between the blocks and the grid structure, preventing any seepage of the mortar below the pilot beads 41. The pilot beads 41 may also be of such a thickness as to be slightly compressed by the edges of the blocks, so as to also have a sealing function. The extremities of the beads 41 are rounded so as to mold the edges of the mortar strips 20 with a characteristically tuck-pointed finish 37. The mortar is simply poured into the spaces 31a and 30a, the excess mortar 35 being troweled away by the tuck-pointing tool 36. The panel is then allowed to rest until the mortar has hardened, and the completed panel may then be simply lifted off the jig 22a and is ready for use.

The grid member A is a straight strip that is secured to an upper face of a grid member 24a. The grid member B is a straight strip of corresponding length that is secured to the upper face of an outer frame member 23a. It differs from the grid member A in that its outer flange 40' is thicker than its inner flange 40, so as to make sealing engagement with the recessed under face of the frame 16. The sections B join the ends of the sections A to form the crossings of the grid structure. The sections D join the ends of the marginal sections B and form junctions with the sections A. The sections E join the sections B at the corners of the jig. The sections B and D have thickened flange members 40' corresponding to the flanges 40' of the sections B and thinner flanges 40 corresponding to the thinner flanges 40 of the sections A and B.

We claim:

1. A method of forming an integral block panel, including the following steps: providing a retaining frame, arranging blocks in predetermined order in said frame to provide spacing between the blocks, sealing off the lower extremities of said spaces, injecting a loose comminuted material into the lower regions of said spaces, inserting a bonding agent into said spaces above said comminuted material, subsequently unsealing the lower extremities of said spaces and removing said comminuted material, inverting the panel and inserting a bonding material into the spaces formerly occupied by said comminuted material.

2. A method of forming an integral block panel utilizing supporting means having upwardly projecting elements for spacing the blocks thereon, including the following steps: Arranging the blocks on said supporting means with spaces between the blocks, into which said upwardly projecting elements extend so as to position the blocks, filling said spaces with loose comminuted material to a height such as to substantially cover the spacing elements, filling the spaces above said comminuted material with a bonding agent to bond the blocks into an integral panel, subsequently separating the panel from said supporting means and removing said comminuted material, inverting the panel, and inserting a bonding agent into the spaces formerly occupied by the comminuted material.

3. A method of forming an integral glass block panel comprising a series of blocks joined in spaced relation by a grid of bonding material, including the following steps: arranging the glass blocks on a support having a plurality of upwardly projecting spacer elements, with spaces between the blocks into which said spacer elements extend, utilizing the engagement of said spacer elements between said blocks to determine the desired spacing of the blocks, and the engagement of the blocks with said supporting means to close the lower extremities of said spaces, filling the lower areas of said spaces with a loose comminuted material to a sufficient height to substantially cover the spacer elements, inserting into the spaces above said comminuted material, a bonding agent to bond the blocks into an integral panel, allowing the bonding agent to set, separating the panel from the supporting means and removing the comminuted material, inverting the panel, and inserting bonding agent into spaces formerly occupied by the comminuted material.

4. A method of forming an integral glass block panel comprising a series of blocks joined in spaced relation by a grid of bonding material, including the following steps: arranging the glass blocks on a support having a plurality of upwardly projecting spacer elements, with spaces between the blocks into which said spacer elements extend, utilizing the engagement of said spacer elements between said blocks to determine the desired spacing of the blocks, and the engagement of the blocks with said supporting means to close the lower extremities of said spaces, filling the lower areas of said spaces with a loose comminuted material to a sufficient height to substantially cover the spacer elements, inserting into the spaces above said comminuted material, a bonding agent to bond the blocks into an integral panel, tuck-pointing the bonding material, allowing the bonding agent to set, separating the panel from the supporting means and removing the comminuted material, inverting the panel, inserting bonding agent into spaces formerly occupied by the comminuted material, and tuck-pointing the bonding material.

5. A method of prefabricating an integral glass block panel comprising a plurality of blocks joined in spaced relation by a grid of bonding material, including the following steps: arranging the blocks upon a supporting means provided with upwardly projecting spacer elements with spaces between the blocks into which said spacer elements extend, utilizing the contact of the blocks with the spacer elements to space the blocks properly, inserting a bonding material into said spaces, allowing the bonding material to set so as to bind the blocks together into an integral panel, separating the panel from the spacer element, inverting the panel, and inserting a bonding material into the spaces formerly occupied by said spacer elements.

6. A method of preforming an integral glass panel comprising a peripheral frame and a plurality of blocks joined in spaced relation by a grid of bonding material, including the following steps: providing a supporting means having upwardly projecting spacer elements, supporting the frame loosely upon said supporting means, arranging the blocks upon said supporting means with spaces between adjacent blocks and between the outer blocks and said frame, with the said spacer elements projecting upwardly into said spaces and functioning to position the blocks, inserting bonding material into said spaces to substantially the level of the upper faces of the blocks, tuck-pointing the bonding material at said upper faces, allowing the bonding material to set so as to bind the blocks together and to said frame in an integral panel, separating the panel from said supporting means and inverting it, inserting additional bonding material into the spaces previously occupied by said spacer elements, and tuck-pointing said additional bonding material.

7. A method of prefabricating an integral glass block panel comprising a plurality of blocks joined in spaced relation by a bonding material and a peripheral frame surrounding and secured to the outer blocks, including the following steps: positioning said blocks upon a supporting means with spaces therebetween, with removable means obstructing the lower portions of said spaces, supporting said frame upon said supporting means in a position surrounding the blocks, inserting bonding material into the unobstructed upper portions of the spaces between the blocks and the spaces between the blocks and frame, tuck-pointing said bonding material at the level of the upper faces of the blocks, allowing the bonding material to set so as to bind the blocks and frame together in an integral panel, inverting the panel and removing said obstructing means, inserting additional bonding material into the formerly obstructed portions of said spaces on the side which was formerly supported on said supporting means, and tuck-pointing said additional bonding material.

8. A method of prefabricating an integral glass block panel comprising a plurality of blocks joined in spaced relation by a bonding material and a peripheral frame surrounding and secured to the outer blocks, including the following steps: positioning said blocks upon a supporting means and inside said frame, with spaces defined between adjacent blocks and between said frame and adjacent blocks, and with removable means obstructing the lower portions of said spaces, inserting bonding material into the unobstructed upper portions of said spaces to a level adjacent the upper faces of the blocks, allowing the bonding material to set so as to bind the blocks and frame together in an integral panel, inverting the panel and removing said obstructing means, and inserting additional bonding material into the formerly obstructed portions of said spaces on the side which was formerly supported on said supporting means, so as to complete the filling of said spaces.

9. A method of prefabricating an integral glass block panel comprising a plurality of blocks joined in spaced relation by a bonding material and a peripheral frame surrounding and secured to the outer blocks, including the following steps: supporting the frame immediately above the plane of a supporting means having a plurality of spacer strips projecting upwardly therefrom, including outer strips immediately adjacent the inner faces of said frame and a plurality of intermediate strips arranged within the confines of said outer strips in crossed relation, properly spaced to be received between blocks arranged in the desired relation to each other on said supporting means, arranging said blocks in said desired relation upon said supporting means with said strips extending upwardly between adjacent blocks and between said frame and the outer blocks, utilizing said spacer strips for spacing said blocks and for obstructing the lower portions of said spaces, filling said spaces, above said obstructed lower portions thereof, with bonding material up to a level adjacent the plane of the upper faces of the blocks, allowing said bonding material to set so as to bind the blocks and frame together in an integral panel, lifting the panel off said supporting means and removing said spacing strips from said lower portions of said spaces, inverting the panel, and then filling the formerly obstructed portions of said spaces with bonding material to complete the filling of said spaces.

THOMAS KIRK ALMROTH.
THOMAS KIRK ALMROTH, JR.

REFERENCES CITED

The following references are of record in the file of this patent:

UNITED STATES PATENTS

| Number | Name | Date |
| --- | --- | --- |
| 1,082,231 | Nale | Dec. 23, 1913 |
| 1,092,195 | Workman | Apr. 7, 1914 |
| 1,137,297 | Treo | Apr. 27, 1915 |
| 1,546,493 | Knipe | July 21, 1925 |
| 1,795,862 | Johnson | Mar. 10, 1931 |
| 1,809,504 | Carvel | June 9, 1931 |
| 1,968,189 | Bartels | July 31, 1934 |
| 2,111,577 | Thomas | Mar. 22, 1938 |